United States Patent [19]
Weber

[11] 4,149,117
[45] Apr. 10, 1979

[54] CIRCUIT AND METHOD FOR SERVO SPEED CONTROL

[75] Inventor: D. William Weber, Fremont, Calif.

[73] Assignee: Ampex Corporation, Redwood City, Calif.

[21] Appl. No.: 778,530

[22] Filed: Mar. 17, 1977

[51] Int. Cl.² ............................................. H62P 5/00
[52] U.S. Cl. .................................... 318/315; 318/318
[58] Field of Search .............. 318/314, 318, 327, 341, 318/326, 329, 341, 315

[56] References Cited

U.S. PATENT DOCUMENTS

| | | | |
|---|---|---|---|
| 3,361,949 | 1/1968 | Brown et al. | 318/314 |
| 3,588,654 | 6/1971 | Balazs | 318/341 |
| 3,634,745 | 1/1972 | Agin | 318/341 |
| 3,657,624 | 4/1972 | Nagano | 318/327 |
| 3,983,316 | 9/1976 | Schopp | 318/314 |

*Primary Examiner*—David Smith, Jr.
*Attorney, Agent, or Firm*—Robert G. Clay; J. Ronald Richbourg

[57] ABSTRACT

A circuit and method for controlling the speed of operation of a servo motor, wherein multiple speeds of operation can readily be controlled. A non-linear ramp voltage is generated in response to a first set of clock signals produced in response to electrical pulses from a tachometer coupled to the servo motor. A second set of clock pulses, also generated by the tachometer pulses, controls periodic sampling of the non-linear ramp voltage at various points along the ramp as a function of the desired speed of operation.

14 Claims, 5 Drawing Figures

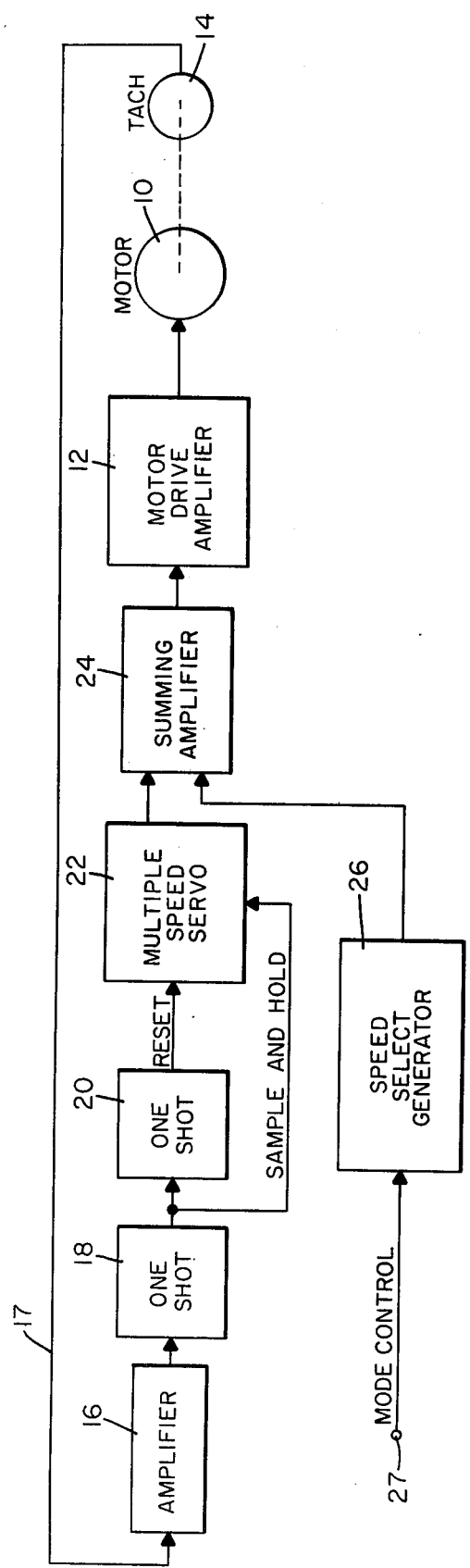
FIG_1
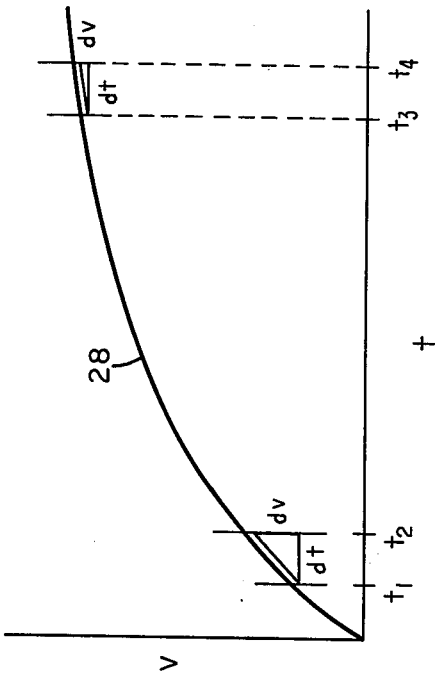
FIG_2

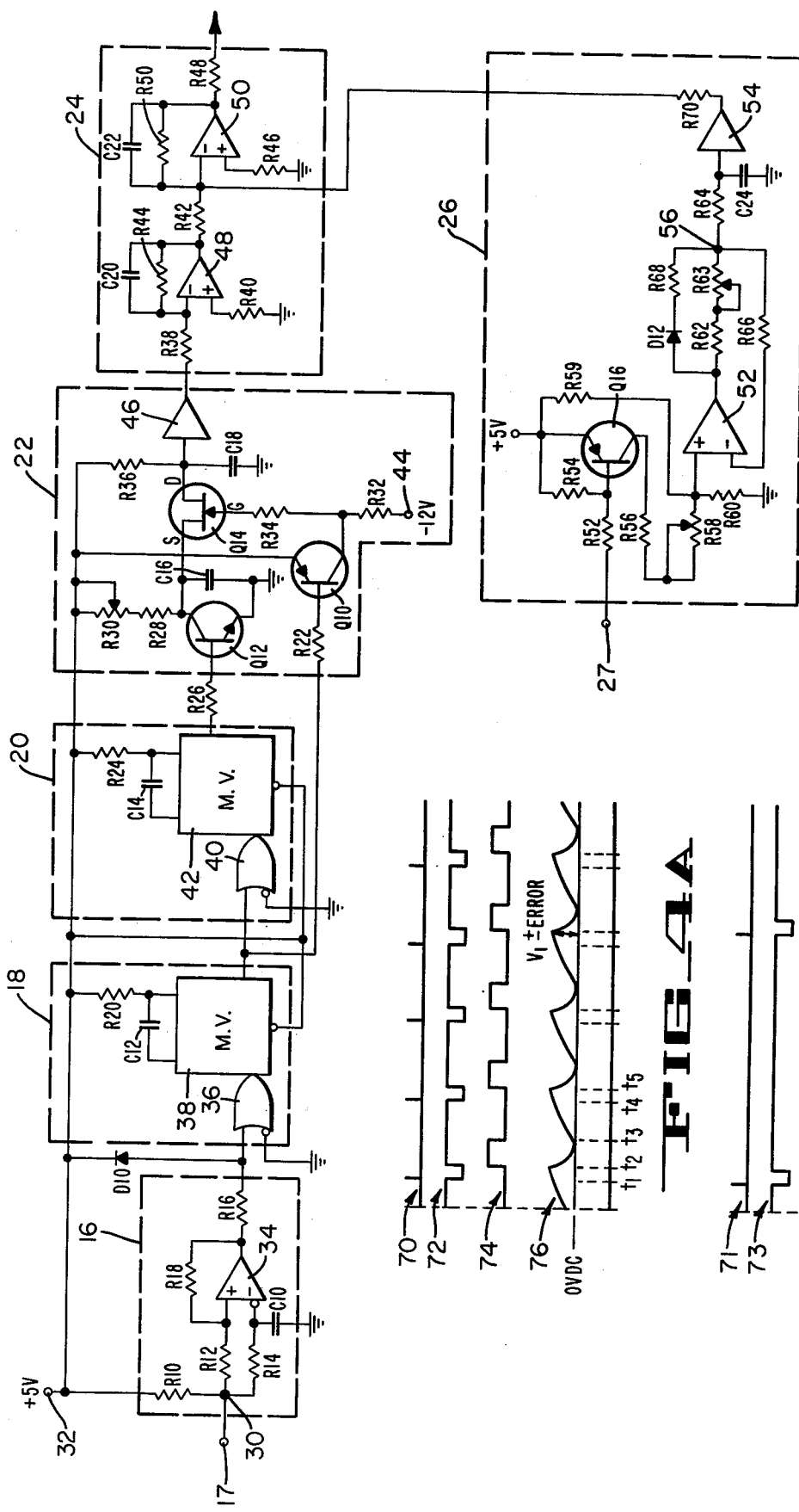

CIRCUIT AND METHOD FOR SERVO SPEED CONTROL

BACKGROUND OF THE INVENTION

1. Field of the Invention

The present invention relates to servo systems and, in particular to a new and improved servo speed control circuit.

2. Prior Art

In the past, servo systems have been designed with linear gain to drive a servo motor at a fixed speed. In particular, such prior art servo systems having a feedback circuit for speed control employ a constant current generator to provide a linear ramp voltage for sampling purposes. The servo system is then tuned for the desired gain and phase margin at a selected speed.

A servo system tuned for operation at one speed may be unstable at other speeds since the gain required in the feedback circuitry is different for different speeds. Thus, if such prior art circuits are used to drive the servo motor at more than one speed, additional circuitry is required to control the speed of operation at each of the desired speeds.

Another approach to the above problem is to employ different current generators adjusted for each of the desired speeds, which generators are selectively switched into the feedback circuit so as to provide the different feedback gains for these different speeds. A problem with this approach is that the gain is correct only at those speeds having the appropriate gain. Other problems are that such circuitry is unreliable, cumbersome and complex.

SUMMARY OF THE INVENTION

In accordance with this invention, a servo speed control circuit is provided for use in a servo drive circuit having a speed select generator coupled to a drive motor through an amplifier. A tachometer is coupled to the servo motor for producing electrical pulses at a frequency proportional to the speed of the motor. The servo speed control circuit of this invention comprises means responsive to the tachometer electrical pulses for generating first and second clock signals, means for storing a charge in response to the first clock signals, means for sampling and holding the stored charge in response to the second clock signals, and means for detecting an error between an output of the speed select generator and the sampled charge and for applying a voltage to the motor amplifier so as to correct the speed of the motor in accordance with the sampled charge.

Also, a method is provided for controlling various speeds of operation of a servomotor having the same constituent circuitry as above; which method comprises, generating first and second clock signals in response to the tachometer electrical pulses, producing a non-linear ramp voltage in response to the first clock signals, sampling and holding the non-linear ramp voltage in response to the second clock signals, detecting a difference voltage between an output of the speed select generator and the sampled non-linear ramp voltage, and applying a voltage to the motor amplifier in accordance with the detected difference voltage so as to control the speed of the motor as a function of when the non-linear ramp voltage is sampled.

A feature of the present invention is the provision of a simple means for controlling the speed of a servo motor operating at various speeds.

Another feature of the present invention is the sampling of a non-linear ramp voltage as a function of the speed of operation of a servomotor so as to provide the appropriate gain of a feedback circuit controlling various speeds of the motor.

An advantage of the present invention is that various speeds of operation of a servomotor can readily be controlled by a simple and reliable feedback circuit.

BRIEF DESCRIPTION OF THE DRAWINGS

FIG. 1 is a block diagram of a motor drive servo system;

FIG. 2 is a diagram of the non-linear ramp voltage used for speed control during multiple speed operation of the motor drive servo system;

FIG. 3 is a schematic diagram of the multiple speed motor servo system and components associated therewith; and, FIGS. 4A and 4B are timing diagrams illustrating the principle of operation of the circuit shown in FIG. 3.

DETAILED DESCRIPTION

Referring to the drawings, and in particular to FIG. 1, a motor 10, which may typically comprise a capstan drive motor for a tape transport or the like, is driven by means of current supplied by a motor drive amplifier 12. A tachometer 14 is mechanically coupled to the shaft of the motor 10, which tachometer produces electrical pulses at a frequency proportional to the speed of rotation of the motor. The electrical pulses are applied to an input of an amplifier 16, by means of a line 17, to increase the voltage level thereof.

The output of the amplifier 16 is coupled to the input of a one-shot 18, which produces a pulse at an output thereof for a predetermined time duration at a frequency equal to that of the tachometer pulses.

The output of the one-shot 18 is coupled to the input of a second one-shot 20, and to a first input of a multiple speed servo 22. The one-shot 20 also produces a pulse at a predetermined time duration at the output thereof in response to transitions of the output signal from the one-shot 18. Thus, the frequency of the pulses at the output of the one-shot 20 is also equal to that of the tachometer pulses. The output of the first one-shot 18 is sometimes referred to herein as a "sample and hold" signal, and the output of the one-shot 20 is sometimes referred to herein as a "reset" signal.

The output of the second one-shot 20 is supplied to a reset input of the multiple speed servo 22. The output terminal of the servo 22 is coupled to a first input terminal of a summing amplifier 24. The second input to the servo 22 is provided by the output of a speed select generator 26, which provides the basic motor drive voltage for a predetermined speed. The input of the generator 26 is provided by a mode control on a terminal 27, which selects the speed at which the motor 10 is to be driven.

Once a speed for the motor 10 has been selected by the mode control, it is the function of the tachometer 14 and the associated feedback circuitry (amplifier 16, one-shots 18 and 20, servo 22 and the summing amplifier 24) to maintain this selected speed. When the illustrated embodiment of the invention is employed in a video tape recorder, there are typically two speeds of operation. A first speed is for normal operation, and a second speed of one-fifth (1/5) normal speed is used for "slow motion" operation.

A basic problem in any servo system is stability of operation. That is, it is undesirable in a servo system, especially a precision video tape recorder system, to allow the servo motor to "hunt." One way to mitigate hunting in the servo system and improve stability of operation is to adjust the gain of the system in accordance with the speed of operation of the servo motor. Accordingly, the preferred gain of the system at a normal speed of operation is different from the preferred gain at a different (e.g., slower) speed of operation.

The present invention provides for a different gain of the system for different speeds by periodically sampling a non-linear ramp voltage at different points on the ramp for the respective different speeds. The non-linear ramp referred to herein is illustrated diagramatically in FIG. 2 as curve 28. The magnitude of the curve 28 is sampled at a point in time between times $t_1$ and $t_2$ when the motor 10 is being driven at a normal speed, and at a point in time between times $t_3$ and $t_4$ when the motor is being driven at a slower speed, which is one-fifth (1/5) normal speed in the illustrated embodiment.

Note that the slope (dv/dt) of the curve 28 between times $t_1$ and $t_2$ is greater than the slope (dv/dt) between times $t_3$ and $t_4$. The slope of the curve 28 determines the amount of gain of the servo system. Thus, it can readily be seen that the gain of the system between times $t_1$ and $t_2$ is greater than the system gain between times $t_3$ and $t_4$. Thus, by sampling a non-linear ramp voltage at different times, the gain of the system can be adjusted accordingly without the use of additional circuit components. It is noted, however, that by using the non-linear ramp voltage to adjust the gain of the feedback circuitry, any number of different speeds of operation can be controlled. That is, the circuit of this invention is not limited to the control of only two speeds.

Referring now to FIG. 3, a schematic diagram of the system of this invention is illustrated. Those portions of the schematic diagram of FIG. 3, which correspond to the blocks shown in FIG. 1 are enclosed within dashed lines identified by like reference numerals.

Line 17 from the tachometer 14 (FIG. 1) is coupled to a circuit junction point 30, which junction point is coupled to a source of voltage (e.g., herein +5 volts) provided on a terminal 32 through a resistor R10. Circuit point 30 is also coupled to the non-inverting input terminal (+) of an amplifier 34 through a resistor R12, and to the inverting input terminal (−) of this amplifier through a resistor R14. It is noted, however, that the inverting input terminal of the amplifier 34 is again inverted as represented by the small circle adjacent to this input terminal. A capacitor C10 is coupled between the inverting input terminal of the amplifier 34 and ground potential to operate in conjunction with the resistor R14 so as to integrate the tachometer pulses applied to this input terminal to an average DC level.

The output terminal of the amplifier 34 is coupled to a first of two input terminals of a NOR gate 36 through a resistor R16. Also, the output of the amplifier 34 is fed back to the non-inverting input thereof through a resistor R18. The NOR gate 36 is a part of the one-shot 18, and the second input of this NOR gate, which is inverted, is coupled to ground potential. The anode terminal of a diode D10 is coupled to the first input of the NOR gate 36, with the cathode terminal thereof being coupled to the voltage source on the terminal 32. The diode D10 functions to clip the output voltage from the amplifier 34 applied to the first input terminal of the NOR gate 36 so as to protect the one-shot 18.

The output of the NOR gate 36 is coupled to the set input terminal of a multivibrator (M.V.) 38. The multivibrator 38 and the NOR gate 36 may typically comprise model No. SN74LS221N manufactured by Texas Instruments. A capacitor C12 is coupled between the timing control terminals of the multivibrator 38, and a resistor R20 is coupled between one of these input terminals and the source of voltage on the terminal 32. The clear input terminal of the multivibrator 38 is inverted and also coupled to the source of voltage on the terminal 32, which thereby disables this input.

The not true (Q) output terminal of the multivibrator 38 is coupled to the first of two input terminals of a NOR gate 40, and the second input terminal of this NOR gate is inverted and coupled to ground potential. The not true (Q) output terminal of the multivibrator 38 is also coupled to the base terminal of a PNP bipolar transistor Q10 through a resistor R22.

The NOR gate 40 forms a part of the one-shot 20, and the output terminal of this NOR gate is coupled to the set input terminal of a second multivibrator 42. A capacitor C14 and resistor R24 are coupled in the same manner as described above for the capacitor C12 and the resistor R20. Also, the clear input terminal of the multivibrator 42 is inverted and coupled to the voltage source terminal 32. The true (Q) output terminal of the multivibrator 42 is coupled to the base terminal of an NPN bipolar transistor Q12 through a resistor R26.

The collector terminal of Q12 is coupled to the voltage source terminal 32 through a resistor R28 and variable resistor R30, both resistors of which are coupled in series. The collector terminal of Q12 is also coupled to the source terminal of a p-channel field-effect-transistor (FET) Q14. A capacitor C16 is coupled between the collector and emitter terminals of Q12, with the emitter terminal of Q12 also being coupled to ground potential.

The non-linear ramp voltage discussed above and illustrated in FIG. 2 is developed across the capacitor C16. When the transistor Q12 is turned ON, the charge across C16 is dissipated to ground potential. Thus, between successive ones of the clock signals provided at the output of the multivibrator 42, a charge is developed across C16. The magnitude of the voltage developed across C16 is non-linear with respect to time by the well-known phenomenon of charging a capacitor.

The change in state of the clock signal from the multivibrator 42 (herein positive level) turns Q12 ON which drops the ramp voltage back to a zero or reference level thereby "resetting" this portion of the circuit.

Returning now to the transistor Q10, the emitter terminal thereof is coupled to the voltage source terminal 32. The collector terminal of Q10 is coupled to another source voltage terminal 44 through a resistor R32. The collector terminal of Q10 is also coupled to the gate terminal of the FET Q14 through a resistor R34. The voltage supplied on the terminal 44 in this exemplary embodiment is negative (i.e., −12 volts) so as to bias the FET Q14 in an OFF state.

The drain terminal of FET Q14 is coupled to the input of an amplifier 46, and to the voltage source terminal 32 through a resistor R36. In addition, a capacitor C18 is coupled between the drain terminal of FET Q14 and ground potential.

When the transistor Q10 is turned ON in response to the clock signal from the multivibrator 38 changing level (herein, to a negative level) the bias voltage on the gate terminal of the FET Q14 is removed, whereby the charge stored on C16 is transferred through this FET to the capacitor C18.

A voltage proportional to the charge transferred to the capacitor C18 is applied to the input of the amplifier 46 for amplification thereof. The output of the amplifier 46 is applied to the inverting input terminal (−) of another amplifier 48 through a resistor R38. The non-inverting input terminal (+) of the amplifier 48 is coupled to ground potential through a resistor R40. The output terminal of the amplifier 48 is coupled to the inverting input terminal (−) of yet another amplifier 50 through a resistor R42. Also, the output of the amplifier 48 is coupled back to the inverting input terminal thereof through a parallel resistor-capacitor (RC) network formed from a resistor R44 and a capacitor C20.

The output of the speed select generator 26 is coupled to the inverting input terminal (−) of the amplifier 50 to form a summing junction at this input terminal. The non-inverting input terminal (+) of the amplifier 50 is coupled to ground potential through a resistor R46. The output terminal of the amplifier 50 is coupled to the input of the drive amplifier 12 (FIG. 1) through a resistor R48. In addition, the output terminal of the amplifier 50 is coupled back to the inverting input terminal (−) thereof through an RC network formed from a resistor R50 and a capacitor C22.

The mode control signal, which is a first binary voltage level for a first mode (first speed of operation, e.g., normal speed) and a second binary voltage level for a second mode (second speed of operation, e.g., slow motion speed), is applied to the base terminal of a PNP bipolar transistor Q16 through a resistor R52. The emitter terminal of Q16 is coupled to a voltage source, which may be the same voltage value as that applied on the terminal 32, and the base terminal of this transistor is coupled to the same voltage source through a resistor R54.

The collector terminal of Q16 is coupled to the non-inverting input terminal (+) of an amplifier 52 through a pair of series-connected resistors R56 and R58. The resistor R58 is preferably a variable resistor, which is employed for minor adjustment of the selected speed during the slow speed mode of operation. A resistor R59 is coupled between the non-inverting input terminal of the amplifier 52 and a voltage source (e.g., +5 volts), and a resistor R60 is coupled between this same input terminal of the amplifier 52 and ground potential.

The output terminal of the amplifier 52 is coupled to the input terminal of yet another amplifier 54 through three series-connected resistors R62, R63 and R64. The resistor R63 is preferably a variable resistor, which is employed for timing adjustment. From the common circuit connection point between resistors R63 and R64, hereafter circuit point 56, another resistor R66 is coupled back to the inverting terminal (−) of the amplifier 52 to provide a negative feedback path for this amplifier.

The anode terminal of a diode D12 is coupled to the output terminal of the amplifier 52, and the cathode terminal thereof is coupled to one side of a resistor R68. The second side of the resistor R68 is coupled to the circuit point 56. A capacitor C24 is coupled between the input terminal of the amplifier 54 and ground potential. The output of the amplifier 54 is coupled to the inverting input terminal of the amplifier 50 through a resistor R70.

To more fully understand the operation of the above-described circuit, assume that a first binary level (e.g., a digital "one," or typically 3.5 volts) is applied to the base terminal of Q16 for the normal speed of operation. In the disclosed embodiment, Q16 would be turned OFF for this mode of operation, and the voltage applied to the non-inverting input of the amplifier 52 would be that portion of the +5 volts divided between resistors R59 and R60. A voltage would subsequently be applied to the amplifier 50 and a drive current would be applied to the motor 10.

If, however, a second binary level (e.g., a digital "zero" or typically 0 to 1.0 volts) were applied to the base terminal of Q16, which would turn this transistor ON, then the voltage applied to the non-inverting input of the amplifier 52 would increase. That is, with Q16 ON, the series combination of resistors R56 and R58 would combine in parallel with R59 to thereby decrease the total resistance between the noninverting input terminal of the amplifier 52 and the voltage source.

Accordingly, motor 10 is driven at a first speed in response to a first mode control signal (first binary level) applied to the base of Q16, and is driven at a second speed in response to the second mode control signal (second binary level) applied to the same base terminal.

When the motor 10 rotates, a series of tachometer pulses are supplied on the line 17 from the tachometer 14. The frequency of the tachometer pulses is indicative of the motor speed. At this juncture of the description reference is made to the timing diagrams shown in FIGS. 4A and 4B for a better understanding of the description of operation which follows.

Waveforms 70 (FIG. 4A) and 71 (FIG. 4B) represent the tachometer pulses for first and second speeds of operation, respectively. Waveforms 72 (FIG. 4A) and 73 (FIG. 4B) represent the sample and hold signal at the output of the one-shot 18 for the two speeds of operation, respectively. Waveforms 74 (FIG. 4A) and 75 (FIG. 4B) represent the reset signal at the output of the one-shot 20 for the same two speeds of operation, respectively. The non-linear ramp voltage developed across the capacitor C16 during these two speeds of operation are represented by waveforms 76 (FIG. 4A) and 77 (FIG. 4B), respectively.

Between times $t_1$ and $t_2$ in both FIGS. 4A and 4B, the magnitude of the non-linear ramp voltage (waveforms 76 and 77) is "sampled" by transferring the charge accumulated across the capacitor C16 through the FET Q14 to the capacitor C18 where it is "held" for an input signal to the amplifier 46. Between times $t_2$ and $t_3$ the capacitor C16 is discharged, which returns the ramp voltage (waveforms 76 and 77) to a zero or reference level. Between times $t_3$ and $t_4$ the capacitor C16 again charges up through the resistors R28 and R30 from the voltage source on the terminal 32. It is noted that the times $t_1$, $t_2$, $t_3$ and $t_4$ as shown in FIG. 2 are not the same as the times $t_1$, $t_2$, $t_3$, $t_4$ and $t_5$ as shown in FIGS. 4A and 4B. For example, the time interval $t_1$–$t_2$ in FIGS. 4A and B is a very small portion of the time interval $t_1$–$t_2$ in FIG. 2.

The timing diagram of FIG. 4A represents a fast or normal speed of operation while the timing diagram of FIG. 4B represents a slower speed of operation. Accordingly, at a slower speed of operation, capacitor C16 has a longer period of time to charge up than at a faster speed of operation. Thus, by selecting appropriate values for the capacitor C16 and resistors R28 and R30, the desired charge time between successive clock pulses can be achieved so as to provide a different slope of the non-linear ramp voltage for different speeds at the sampling times. The different slopes of the ramp voltage therefore provide different gains for the system at different speeds of operation. It is again pointed out that the circuit of this invention is not limited to controlling just two speeds of operation as illustrated, but can control any speed of operation by sampling the non-linear ramp voltage at the appropriate point on the ramp.

By using the one-shot 38 triggered by the tachometer pulses, the sample time duration remains constant. Also, by using one-shot 42 triggered by the one-shot 38, the capacitor C16 is discharged immediately after sampling.

In one embodiment of the present invention, the following values for the above-described pertinent circuit components were selected:

One Shot 38: 10 microseconds
    Capacitor C12: 0.001 microfarads
    REsistor R20: 15k ohms The criteria for selecting these values was to provide sufficient time for full charge transfer from the capacitor C16 to the capacitor C18.

One Shot 42: 20 microseconds
    Capacitor C14: 0.001 microfarads
    Resistor R24: 30k ohms The criteria for selecting these values was to provide sufficient time for full discharge of the capacitor C16 by the transistor Q12 before the next subsequent ramp voltage began.

Resistor R28: 7.5k ohms at 1%
Resistor R30: 5k ohms, variable
Capacitor C16: 0.1 microfarads
Capacitor C18: 0.047 microfarads The amplifier 50 will force the motor 10 and the tachometer 14 to the speed necessary to cancel any differences in DC level between the reference drive from the amplifier 54 and the sampled ramp voltage appearing at the output of the amplifier 48. Thus, as is shown in FIGS. 4A and 4B, voltage magnitude $V_1$ of waveform 76 at the sample time represents the high (e.g., normal) speed of operation plus or minus any speed error; while voltage magnitude $V_2$ (of waveform 77 at the sample time) represents the slower (e.g., 1/5 normal) speed of operation plus or minus any speed error.

The reference drive voltage from the amplifier 54 is positive and so is the ramp voltage appearing at the output of the amplifier 48. However, the function of the amplifier 50 is to subtract the two voltages appearing at the inputs thereof, and to drive the motor 10 with the results of this subtraction operation. Accordingly, the amplifier 48 is coupled in an inverting configuration so as to provide the ramp voltage at the output thereof in an inverted mode.

The resistor-capacitor network comprising the resistors R38 and R44, and the capacitor C20 functions not only as a gain control for the amplifier 48, but also functions as part of the servo system phase control. The network comprising the resistor R50 and the capacitor C22 functions in a similar manner.

To summarize the operation of the above-described servo speed control circuit and method, reference is made again to FIGS. 1 and 2. The speed select generator 26 produces a voltage having a magnitude that causes the motor 10 to operate at an optimum speed. The speed of the motor 10 in response to the produced voltage is detected by the tachometer 14, which produces a series of spaced-apart pulses. The time duration between each of the tachometer pulses represents the speed of the motor 10. A non-linear ramp voltage is developed in response to each of the tachometer pulses, and the magnitude of this ramp voltage is sampled at the time of each tachometer pulse to detect any speed errors. The sampled magnitude of the ramp voltage is summed with the magnitude of the voltage produced by the generator 26 by means of the amplifier 24. Any differences between the two voltage magnitudes (i.e., an error voltage differential) modify the value of the voltage driving the motor 10 so as to correct for speed discrepancies.

Since the time displacement of the tachometer pulses represents speed, an error in speed would likewise be represented by a time displacement. The voltage differential for the same time displacement at normal speed is much greater than it is for slow speed, which is a function of the difference in the slope of the non-linear ramp voltage at these two different speeds; and the difference in the voltage differentials provides correspondingly different gains for the drive amplifier.

By way of example, if the magnitude of the sampled non-linear ramp voltage is less than the magnitude of the voltage produced by the generator 26 (going too fast), the output voltage from the motor drive amplifier decreases to decrease the speed of the motor. Conversely, if the magnitude of the sampled non-linear ramp voltage is greater than the magnitude of the generator voltage (going too slow), then the drive voltage to the motor is increased to thereby increase the speed of the motor 10.

When the motor operating speed is fast (or at normal speed) and the magnitude of the voltage from the generator 26 corresponds to a point on the curve 28 within the sample interval $t_1$–$t_2$, the slope of the curve 28 is greater than within the slower speed sample interval $t_3$–$t_4$. This greater magnitude difference in the $t_1$–$t_2$ sample interval provides a greater gain for the drive amplifier 12 than the gain provided during the $t_3$–$t_4$ sample interval, which is a function of the difference in slope during the $t_1$–$t_2$ and the $t_3$–$t_4$ sample intervals. Accordingly, the gain from the drive amplifier 12 is automatically compensated for various speeds of operation without the need for additional circuitry adapted to provide the appropriate gain at each of the various speeds of operation.

It is noted that during each of the sampling intervals the non-linear ramp voltage is substantially linear. However, the slope of the curve 28 is greater within the $t_1$–$t_2$ sample interval than it is within the $t_3$–$t_4$ sample interval; and it is this difference in slope that provides for the different gains for the amplifier 12 at the different speeds.

Though a specific embodiment of the present invention has been described and illustrated in detail hereinabove, it is understood that others skilled in the art will make modifications and changes in the disclosed embodiment. Therefore, the breadth and scope of the invention is to be limited only by the appended claims.

I claim:

1. In a servo drive circuit having a speed select generator coupled to a drive motor through an amplifier, and having a tachometer coupled to said drive motor for producing electrical pulses at a frequency proportional to the speed of said motor, an improved servo speed control circuit comprising:

means responsive to the tachometer electrical pulses for generating first and second clock signals;

means for generating a non-linear ramp voltage in response to said first clock signals;

means for sampling said non-linear ramp voltage in response to said second clock signals; and means for detecting an error between an output of said speed select generator and said sampled non-linear ramp voltage and for applying a voltage to said motor amplifier so as to correct the speed of said motor in accordance with said sampled non-linear ramp voltage.

2. An improved servo speed control circuit in accordance with claim 1 further characterized by said means responsive to said tachometer electrical pulses comprising a cascaded pair of one-shot circuits, wherein a first of said pair of cascaded one-shot circuits produces said second clock signals in response to said tachometer electrical pulses and the second of said pair of cascaded one-shots produces said first clock signals in response to said second clock signals.

3. An improved servo speed control circuit in accordance with claim 1 further characterized by said means for generating a non-linear ramp voltage comprising a transistor switching means coupled in parallel with a capacitor and the switching input terminal thereof being coupled to said first clock signal, whereby charge is stored on said capacitor during a first state of said first clock signal and discharged by a second state of said first clock signal.

4. An improved servo speed control circuit in accordance with claim 1 further characterized by said means for sampling comprising a transistor switching means coupled to an output terminal of said means for generating a non-linear ramp voltage, having a switching input terminal coupled to said second clock signal and an output terminal coupled to one plate of a storage capacitor with the other plate of said capacitor being coupled to a reference potential, whereby said ramp voltage is sampled in response to said second clock signal which sampled ramp voltage is held by said capacitor.

5. An improved servo speed control circuit as in claim 1 further characterized by said means for detecting an error comprising a differential amplifier having a first input terminal coupled to said means for sampling, a second input terminal coupled to an output of said speed select generator, and an output terminal thereof coupled to an input terminal of said motor drive amplifier.

6. An improved servo speed control circuit as in claim 1 further characterized by said means for detecting an error comprising a differential amplifier having a first input terminal coupled to an output terminal of said speed select generator and a second input terminal coupled to an output of said means for sampling.

7. A method for controlling multiple speeds of operation of a servo drive circuit having a speed select generator coupled to a drive motor through an amplifier, and having a tachometer coupled to said drive motor for producing electrical pulses at a frequency proportional to the speed of said motor, said method comprising the steps of;

generating first and second clock pulses in response to said tachometer electrical pulses;

developing a non-linear ramp voltage in response to said first clock signals;

sampling said non-linear ramp voltage in response to said second clock signals;

detecting a difference voltage between an output of said speed select generator and said sampled non-linear ramp voltage; and applying a voltage to said motor amplifier in accordance with said detected difference voltage so as to control the speed of said motor as a function of when said non-linear ramp voltage is sampled.

8. A method as in claim 7 further characterized by said step of developing a non-linear ramp voltage including allowing a capacitor to charge followed by discharging said capacitor in response to said first clock signals such that said non-linear ramp voltage is periodically developed across said capacitor.

9. In a servo drive circuit having a speed select generator coupled to a drive motor, and having a tachometer coupled to said drive motor for producing electrical pulses at a frequency proportional to the speed of said motor, an improved servo speed control circuit comprising:

a first multivibrator having an input trigger terminal coupled to receive said electrical pulses from said tachometer, and having an output terminal;

a second multivibrator having an input terminal coupled to said output terminal of said first multivibrator, and having an output terminal;

a first switching means coupled in parallel with a voltage storage means, said first switching means having a switching input terminal coupled to said output terminal of said second multivibrator, said voltage storage means being disposed for developing a non-linear ramp voltage;

a second switching means having an input terminal coupled to said voltage storage means, an output terminal, and a switching input terminal coupled to said output terminal of said first multivibrator, whereby voltage is stored on said voltage storage means in response to output signals from said second multivibrator and said stored voltage being proportional to the magnitude of said non-linear ramp voltage at the time of said electrical pulses; and, a differential amplifier having an output terminal coupled to said drive motor, a first input terminal coupled to an output terminal of said speed select generator and a second input terminal coupled to said output terminal of said second switching means, said differential amplifier being disposed for detecting an error between the output of said speed select generator and the stored voltage and for applying a speed error voltage at the proper gain to said motor to correct for any detected speed errors.

10. A servo drive circuit as in claim 9 further characterized by said first multivibrator including resistive and capacitive elements for determining the duration of pulses supplied at the output terminal of said first multivibrator.

11. A servo drive circuit as in claim 9 further characterized by said second multivibrator including resistive and capacitive elements for determining the duration of pulses supplied at the output terminal of said second multivibrator.

12. A servo drive circuit as in claim 9 further characterized by said voltage storage means comprising a capacitive element.

13. A servo drive circuit as in claim 12 further characterized by the voltage stored by said capacitive element being a non-linear ramp voltage developed thereacross between each alternate transition of the signal appearing at the output terminal of said second multivibrator such that the amplitude of said non-linear ramp voltage is determined by the speed of rotation of said motor.

14. A servo drive circuit as in claim 13 further characterized by said second switching means including a sample-and-hold circuit disposed for applying a voltage to said drive motor at a frequency determined by the speed of rotation of said motor and at an amplitude determined by the instantaneous sampled amplitude of said non-linear ramp voltage.

* * * * *